(12) United States Patent
Guo et al.

(10) Patent No.: US 12,518,070 B2
(45) Date of Patent: Jan. 6, 2026

(54) OPTIMAL ALLOCATION METHOD OF COMPLEX WATER RESOURCE SYSTEM BASED ON "ZONING-GRADING" THEORY

(71) Applicant: ZHEJIANG UNIVERSITY, Zhejiang (CN)

(72) Inventors: Yuxue Guo, Hangzhou (CN); Yueping Xu, Hangzhou (CN); Weiping Cheng, Hangzhou (CN); Xinting Yu, Hangzhou (CN); Yanfeng You, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 1080 days.

(21) Appl. No.: 17/533,112

(22) Filed: Nov. 23, 2021

(65) Prior Publication Data

US 2022/0092238 A1 Mar. 24, 2022

Related U.S. Application Data (63) Continuation of application No. PCT/CN2021/085198, filed on Apr. 2, 2021.

(30) Foreign Application Priority Data

Jul. 13, 2020 (CN) .......................... 202010668751.6

(51) Int. Cl.
G06F 30/20 (2020.01)
G06Q 10/04 (2023.01)
(Continued)

(52) U.S. Cl.
CPC ............. *G06F 30/20* (2020.01); *G06Q 10/04* (2013.01); *G06Q 10/06315* (2013.01);
(Continued)

(58) Field of Classification Search
CPC .. G06F 30/20; G06F 2113/14; G06F 2111/10; G06Q 10/04; G06Q 10/06315; G06Q 50/06
See application file for complete search history.

(56) References Cited

U.S. PATENT DOCUMENTS 7,593,839 B1 * 9/2009 Wu .......................... G06F 30/13
703/2

FOREIGN PATENT DOCUMENTS

CN 102841595 A 12/2012
CN 104700150 A 6/2015
(Continued)

OTHER PUBLICATIONS

Christiana M. Papapostolou, NPL, "Sustainable water supply systems for the islands: The integration with the energy problem". Renewable Energy, Published Jul. 29, 2019 (Year: 2019).*
(Continued)

*Primary Examiner* — Rehana Perveen
*Assistant Examiner* — Angel Calle
(74) *Attorney, Agent, or Firm* — Wiersch Law Group (57) ABSTRACT

Provided is an optimal allocation method of a complex water resource system based on a "zoning-grading" theory, including the following steps: first, obtaining basic information data of the water resource system, and then generalizing the complex water resource system into different units; second, dividing the entire complex water resource system into zones according to the water supply relationship among reservoirs, pumping stations, rivers, water pipelines, and water plants, and respectively establishing digital matrices of hydraulic relationships of different zones; and finally, constructing and solving a multigrade optimal allocation model of the water resource system according to the types of water supply sources, and determining a reasonable set of (Continued)

optimal allocation solutions. The present application can simplify the complex water resource system and provide a new way to utilize water resources efficiently.

4 Claims, 5 Drawing Sheets

(51) Int. Cl.
    *G06Q 10/0631*     (2023.01)
    *G06Q 50/06*     (2012.01)
    *G06F 111/10*     (2020.01)
    *G06F 113/14*     (2020.01)

(52) U.S. Cl.
    CPC .......... *G06Q 50/06* (2013.01); *G06F 2111/10* (2020.01); *G06F 2113/14* (2020.01)

(56) References Cited

FOREIGN PATENT DOCUMENTS

| | | | |
|---|---|---|---|
| CN | 107491855 A | 12/2017 | |
| CN | 108764557 A | 11/2018 | |
| CN | 108764573 A | 11/2018 | |
| CN | 109658287 A | 4/2019 | |
| CN | 109919485 A | 6/2019 | |
| CN | 110276700 A | 9/2019 | |
| CN | 111724003 A | 9/2020 | |
| CN | 109658287 B | * 1/2023 | ............. G06F 30/20 |

OTHER PUBLICATIONS

Sen Yu, NPL "An integrated model of water resources optimization allocation based on projection pursuit model—Grey wolf optimization method in a transboundary river basin", Journal of Hydrology, Published: Feb. 15, 2018 (Year: 2018).*

S. Sankaranarayanan, "A Novel Hybridized Grey Wolf Optimization for a Cost Optimal Design of Water Distribution Network" (Year: 2017).*

Dunia Abdulbaki, NPL, "An optimization model for the allocation of water resources", Jul. 6, 2017 (Year: 2017).*

Wei-Chen Cheng, NPL, "A flow path model for regional water distribution optimization", 2009 (Year: 2009).*

International Search Report (PCT/CN2021/085198); Date of Mailing: Jun. 29, 2021.

First Office Action(202010668751.6); Date of Mailing: Jan. 25, 2021.

* cited by examiner

OPTIMAL ALLOCATION METHOD OF COMPLEX WATER RESOURCE SYSTEM BASED ON "ZONING-GRADING" THEORY

CROSS-REFERENCE TO RELATED APPLICATIONS

The present application is a continuation of International Application No. PCT/CN2021/085198, filed on Apr. 2, 2021, which claims priority to Chinese Application No. 202010668751.6, filed on Jul. 13, 2020, the contents of both of which are incorporated herein by reference in their entireties.

TECHNICAL FIELD

The present application belongs to the field of water resources management, and relates to an optimal allocation method for a complex water resource system based on a "zoning-ranking" theory.

BACKGROUND

The water resource shortage caused by the uneven distribution of water resources in time and space is still a challenge. To solve this problem, the optimal allocation of water resources has been used to improve the utilization rate of water resources, which has obvious social and economic benefits. However, with the rapid development of society and economy, more and more factors need to be considered in the water resources allocation, especially for a complex water resource system. Additionally, dimensionality disasters are prone to occur in constructing and solving an optimal allocation model. Therefore, it is necessary to perform zoning processing on the system to achieve effective dimensionality reduction and improve calculation efficiency. The optimal allocation models of water resources usually take the maximum total water supply guarantee rate of the entire zone as the goal of social benefits, and thus it is challenging to ensure the fairness of water supply for each sub-zone. In addition, the gray wolf optimization algorithm (GWO) proposed by Mirjalili et al. (2014) has been proved to be significantly better than the particle swarm optimization (PSO), the difference algorithm (DE), the genetic algorithm (GA), and other optimization algorithms in terms of function solving accuracy and stability. It can be used to solve the optimal allocation model of water resources. However, the standard GWO still has the disadvantages of slow convergence speed, weak global search ability, and is easy to fall into local optimum.

SUMMARY

The purpose of the present application is to provide an optimal allocation method for a complex water resource system. According to the method, an optimal allocation model of water resources is constructed based on a "zoning-grading" theory. Meanwhile, the gray wolf algorithm is improved and applied to model solving to determine an optimal water allocation solution set. This method can simplify the multi-dimensional optimization solution process, avoid falling into local optimization, improve the calculation efficiency, ensure the fairness of water supply for each water user and increase the water supply guarantee rate.

The technical solution of the present application is:

An optimal allocation method for a complex water resource system based on a "zoning-grading" theory includes the following steps:

step 1, obtaining primary information data of the water resource system, including a relationship curve between reservoir level and reservoir storage, basic characteristic parameters and geographical location information of reservoirs, pumping stations, rivers, water pipelines, and water plants;

step 2, generalizing the complex water resource system into different units, including nodes and directed line segments;

step 3, dividing the entire complex water resource system into zones, and respectively establishing digital matrices of hydraulic relationships of different zones; and step 4, constructing and solving a multigrade optimal allocation model for the water resources system according to water sources types so as to obtain an optimal water allocation solutions set.

In the above technical solution, further, in the step 2, the reservoirs, the pumping stations, the rivers, and the water plants in the system are respectively generalized into nodes, and the water pipelines are generalized into directed line segments.

Further, the zoning principle in the step 3 is to perform zoning with the water plants as zoning centers, in accordance with the hydraulic relationships among the reservoirs, the pumping stations, the rivers, the water pipelines, and the water plants.

Furthermore, in the step 3, the intersections between different sub-zones are generalized into virtual nodes.

Further, in the step 3, the hydraulic relationships are all digitally represented by 0, −1 and 1, wherein 0 means no hydraulic relationship, −1 means outflow, and 1 means inflow.

Further, the water sources in the step 4 include the local water and transferred water, wherein the local water includes the water stored in reservoirs and rivers.

Further, the step 4 of constructing and solving the multigrade optimal allocation model of the water resource system according to the types of water sources includes the following steps:

step 4-1, considering only local water, establishing a first-grade single-objective optimal allocation model of water resources. With the water resource system of each sub-zone as an object, the single-objective optimal allocation model of water resources of each sub-zone is constructed with the maximum water supply guarantee rate of the water plant as an objective function, and with the water balance, the available water supply of local water sources, the discharge capacity of the pumping stations, and the water carrying capacity of the pipelines as constraints, wherein the objective function is:

$$\text{Max} f(x) = \sum_{i=1}^{I} \sum_{j=1}^{J} x_{ij} \Big/ \sum_{j=1}^{J} Q_j * 100\% \qquad (1)$$

in the formula, $Q_j$ represents the water demand (m³) of the $j^{th}$ water plant, and $x_{ij}$ represents the water supply volume (m³) from the $i^{th}$ reservoir to the $j^{th}$ water plant.

Step 4-2: using an improved single-objective gray wolf algorithm to solve the above model, so as to determine the water deficit $WQ_i$ of each water plant, wherein i=1,2, ..., M, wherein M represents a number of water plants in the entire water resource system;

step 4-3, considering both the local water and the transferred water, establishing a second-grade multi-objective optimal allocation model of water resources. With the entire water resource system as the object, the multi-objective optimal allocation model of water resources is constructed with the maximum water supply guarantee rate and the minimum total operating cost as objective functions, and with the amount of the transferred water allocated to each water plant not less than the water deficit $WQ_i$ of each water plant, the water balance, the available water supply of local water sources, the available water supply of transferred water resources, the discharge capacity of the pumping stations, and the water carrying capacity of the pipelines as constraints, wherein the objective functions are:

Maximum water supply gurantee rate $$\text{Max} f_1(x) = \sum_{k=1}^{K} \sum_{i=1}^{I} \sum_{j=1}^{J} x_{ij} / \sum_{k=1}^{K} \sum_{j=1}^{J} Q \quad (2)$$

Minimum operating cost $\text{Min} f_2(x) = M_e + M_i - M_b$ (3)

in the formula, k=1,2, ..., K presents the number of sub-zones, $M_i$ presents the usage fee (¥) of local water, $M_e$ presents the usage fee (¥) of transferred water, and $M_b$ presents the income (¥). Among them, the usage fee of local water includes an operating electricity fee of the pumping stations, a government water resource fee and a purchase fee of non-self-owned reservoir water resources; and the usage fee of transferred water includes a government water resource fee and a operating electricity fee of the pumping stations.

Step 4-4, using the improved multi-objective gray wolf algorithm to solve the multi-objective optimal allocation model, so as to obtain a Pareto solution set and determine the volume of local water supply and transferred water under different solutions.

Further, the step 4-2 of using the improved single-objective gray wolf algorithm to solve the single-objective optimal allocation model of each sub-zone includes the following steps:

step 4-2-1, initializing algorithm parameters and a population. The size of the population is Popsize, the maximum number of iterations Maxgen, the number of decision variables is Dimension, the value range of the decision variables is [Lb, Ub], and the gray wolf population is initialized according to the value range of the decision variables $X=[X_1, X_2, ..., X_1, ..., X_{Popsize}]$;

step 4-2-2, calculating the fitness of each individual in the population, wherein the greater the water supply guarantee rate of the water plant is, the greater the fitness is; performing sorting according to the fitness, and selecting the three individuals with the maximum fitness as $X_\alpha, X_\beta, X_\delta$, where $X_\alpha$ represents the global optimal gray wolf;

step 4-2-3, using $X_\alpha, X_\beta, X_\delta$ to update all gray wolves in the population, wherein the update mode is:

$D_\alpha = |C \cdot X_\alpha(t) - X_i(t)|$ $D_\beta = |C \cdot X_\beta(t) - X_i(t)|$ $D_\delta = |C \cdot X_\delta(t) - X_i(t)|$ $X_1 = X_\alpha(t) - A \cdot D_\alpha$ $X_2 = X_\beta(t) - A \cdot D_\beta$ $X_3 = X_\delta(t) - A \cdot D_\delta$ $X_i(t+1) = (X_1 + X_2 + X_3)/3$ (4)

where t represents the number ofiterations, $A=2a \times r_1 - a$, $C = 2 \times r_2$; A, C, and a are convergence factors, $r_1$ and $r_2$ are random variables, $r_1, r_2 \in (0, 1)$, and $D_\alpha, D_\beta, D_\delta$ represent the distance between the individuals $D_\alpha, D_\beta, D_\delta$ and the individual $X_i$.

Step 4-2-4, judging whether the number of iterations has reached MAXGEN, if yes, terminating the operation and outputting the water deficit of the water plant; and if not, returning to step 4-2-2; and step 4-2-5, determining the water deficit of all water plants in the system.

Further, in the step 4-2-3, the convergence factor a adopts a parabola-based nonlinear convergence mode to converge, and the equation is:

$a = 2 - 2(t/\text{MAXGEN})^2$ (5)

wherein, t represents the current number of iterations and MAXGEN represents the maximum number of iterations.

Further, the step 4-4 of using the improved multi-objective gray wolf algorithm to solve the multi-objective optimal allocation model includes the following steps:

step 4-4-1, initializing algorithm parameters and a population. The size of the population is $N_p$, the number of external archive sets is $N_e$, the maximum number of iterations is $N_{gen}$, the number of decision variables is $N_d$, the value range of the decision variables is [Lb, Ub], and the gray wolf population X is initialized according to the value range of the decision variables;

step 4-4-2, calculating a fitness value of each individual in the population, calculating non-dominated sorting grades $[P_j^t]_{rank}$(j=1,2, ..., N) and crowding distances $d_j^t$ (j=1,2, ..., N) of all individuals according to the fitness value, and selecting $N_e$ individuals to form an initial external archive set NEA according to the following rules: selecting individuals from the non-dominated sorting grade rank=1, and if the number of individuals in the grade rank=1 is greater than $N_e$, selecting the first $N_e$ individuals with greater crowding distances in grade rank=1; if not, selecting the first individuals with greater crowding distances with sorting grades rank=rank+1, until the number of individuals in the external archive set NEA is $N_e$;

step 4-4-3, selecting three individuals $X_\alpha', X_\beta', X_\delta'$ as priority grades in the external archive set NEA according to the following rules: if the number of the non-dominated sorting grades is equal to 1, selecting the first three individuals with the maximum crowding distance in the grade rank=1 as $X_\alpha', X_\beta', X_\delta'$, respectively; if the number of the non-dominated sorting grades is equal to 2, selecting the first two individuals with the maximum crowding distance in the grade rank=1 as $X_\alpha', X_\beta'$, and selecting the individual with the maximum crowding distance in the grade rank=2 as $X_\delta'$; if the number of the non-dominated sorting grades is greater than 2, selecting three individuals with maximum crowding distance in the grades rank=1, 2, and 3 to serve as $X_\alpha', X_\beta', X_\beta'$, respectively, where $X_\alpha'$ represents the global optimal gray wolf;

step 4-4-4, updating all gray wolf individuals in the population according to $X_\alpha', X_\beta', X_\delta'$ by using formulas (4)-(5);

step 4-4-5, calculating the fitness value of each individual in the population, merging the updated new population with the external archive set NEA, and updating the external archive set NEA according to the selection rules in step 4-4-2;

step 4-4-6, judging whether the number of iterations has reached MAXGEN, if yes, terminating the operation and outputting a Pareto non-inferior solution set in the external archive set NEA; if not, returning to step 4-4-3; and step 4-4-7, collating and outputting a water supply volume of reservoirs and a transferred water volume, respectively, under different non-inferior solutions.

The beneficial effects of the present application are as follows:

(1) With the water plant as the center, the zoning processing is carried out on the water resource system according to the water supply relationship, and thus the high-dimensional optimization solution process of the complex water resource system can be simplified;

(2) the multigrade optimal allocation model of the water resource system is constructed and solved based on the water sources types, and thus the economic benefit and utilization of water resources can be maximized while the water supply guarantee rate is increased;

(3) the digital matrices of hydraulic relationships of different zones are established so that the hydraulic connections between complex water resource system units can be intuitively displayed, and the process of constructing and solving the model is simplified;

(4) the water deficit is calculated with the maximum water supply guarantee rate of each sub-zone as the objective function so that the water supply for each water user is fair; and (5) the parabolic-based nonlinear convergence strategy is used so that the initial attenuation of the convergence factor a can be reduced to ensure a better search for a globally optimal solution; and the later attenuation is increased to search for a locally optimal solution more accurately, and the global search and local search capabilities of the gray wolf algorithm can be effectively balanced to improve the model solving efficiency.

DESCRIPTION OF EMBODIMENTS

Figure 1:
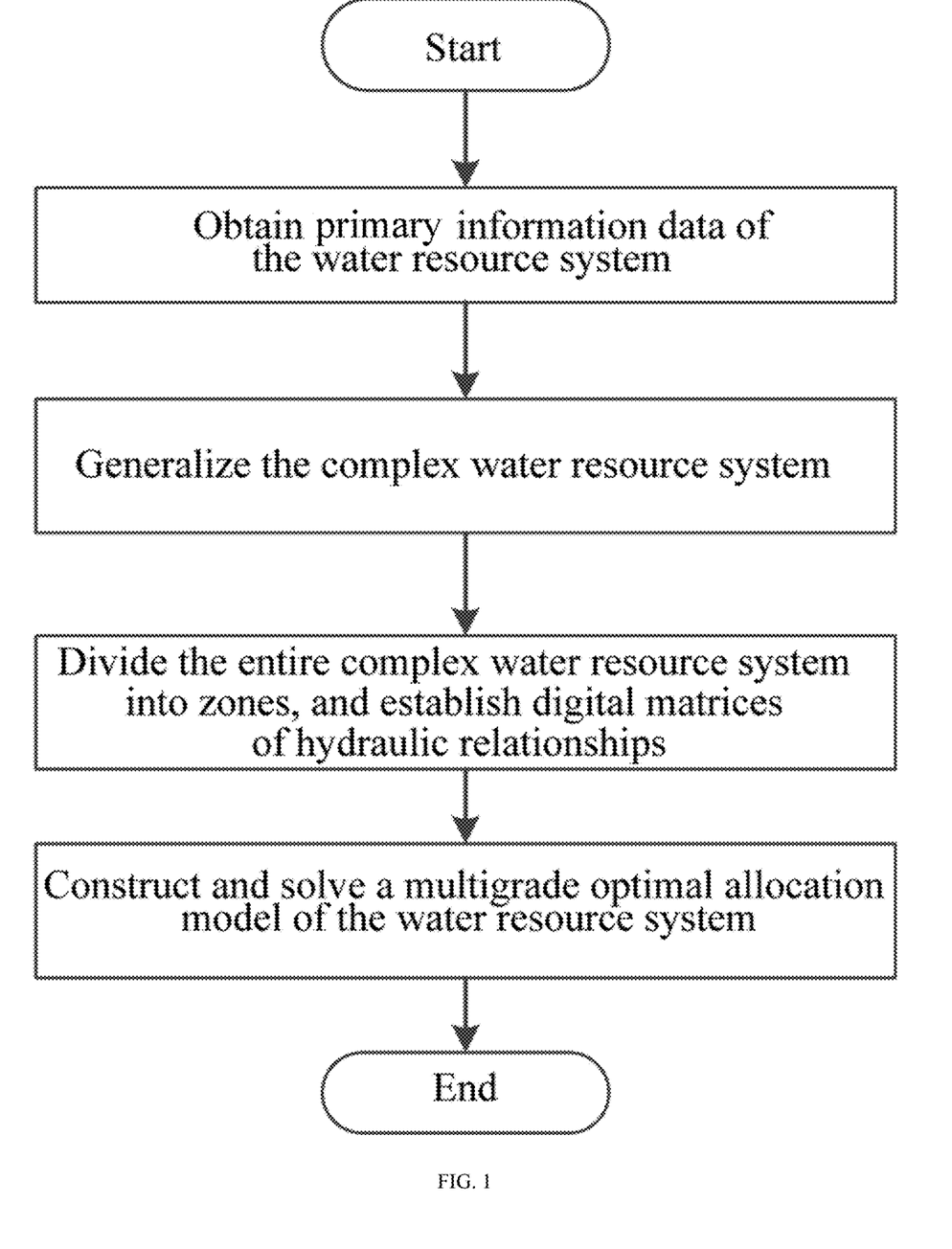
FIG. 1 is a flow chart of the method of the present application.

As shown in FIG. 1, an optimal allocation method of a complex water resource system based on a "zoning-grading" theory includes the following steps:

step 1, obtaining primary information data of the water resource system, including a reservoir level-reservoir storage capacity relationship curve, basic characteristic parameters, and geographical location information of reservoirs, pumping stations, rivers, water pipelines, and water plants;

step 2, generalizing the complex water resource system into different units, including nodes and directed line segments;

step 3, dividing the entire complex water resource system into zones, and respectively establishing digital matrices of hydraulic relationships of different zones; and step 4, constructing and solving a multigrade optimal allocation model of the water resources system according to water sources types to obtain an optimal water allocation solution set.

In the step 2, the reservoirs, the pumping stations, the rivers, and the water plants in the system are respectively generalized into nodes, and the water pipelines are generalized into directed line segments.

The zoning principle in the step 3 is to perform zoning with the water plants as zoning centers, in accordance with the water supply relationship among the reservoirs, the pumping stations, the rivers, the water pipelines, and the water plants.

In the step 3, the intersections between different sub-zones are generalized into virtual nodes.

In the step 3, the hydraulic relationship matrices are all digitally represented by 0, −1, and 1, wherein 0 means no hydraulic relationship, −1 means outflow, and 1 means inflow.

The water supply sources in the step 4 include the local water and transferred water, wherein the local water includes the water stored in reservoirs and rivers.

Step 4-1, considering only local water, establishing a first-grade single-objective optimal allocation model of water resources. With the water resource system of each sub-zone as an object, the single-objective optimal allocation model of water resources of each sub-zone is constructed with the maximum water supply guarantee rate of the water plant as an objective function, and with the water balance, the available water supply of local water sources, the discharge capacity of the pumping stations, and the water carrying capacity of the pipelines as constraints, wherein the objective function is:

$$\operatorname{Max} f(x) = \sum_{i=1}^{I} \sum_{j=1}^{J} x_{ij} \Big/ \sum_{j=1}^{J} Q_j * 100\% \qquad (1)$$

in the formula, $Q_j$ represents the water demand (m³) of the $j^{th}$ water plant, and $X_{ij}$ represents the water supply volume (m³) from the $i^{th}$ reservoir to the $j^{th}$ water plant.

Step 4-2: using an improved single-objective gray wolf algorithm to solve the above model, so as to determine the water deficit $WQ_i$ of each water plant, wherein i=1,2, . . . , M, wherein M represents a number of water plants in the entire water resource system;

step 4-3, considering both the local water and the transferred water, establishing a second-grade multi-objective optimal allocation model of water resources. With the entire water resource system as the object, the multi-objective optimal allocation model of water resources is constructed with the maximum water supply guarantee rate and the minimum total operating cost as objective functions, and with the amount of the transferred water allocated to each water plant not less than the water deficit $WQ_i$ of each water plant, the water balance, the available water supply of local water sources, the available water supply of transferred water resources, the discharge capacity of the pumping stations, and the water carrying capacity of the pipelines as constraints, wherein the objective functions are:

Maximum water supply gurantee rate $$\mathrm{Max} f_1(x) = \sum_{k=1}^{K}\sum_{i=1}^{I}\sum_{j=1}^{J} x_{ij} \Big/ \sum_{k=1}^{K}\sum_{j=1}^{J} Q_j \quad (2)$$

Minimum operating cost $\mathrm{Min} f_2(x) = M_e + M_i - M_b$ (3)

in the formula, k=1,2, ..., K presents the number of sub-zones, $M_i$ presents the usage fee (¥) of local water, $M_e$ presents the usage fee (¥) of transferred water, and $M_b$ presents the income (¥). Among them, the usage fee of local water includes an operating electricity fee of the pumping stations, a government water resource fee and a purchase fee of non-self-owned reservoir water resources; and the usage fee of transferred water includes a government water resource fee and an operating electricity fee of the pumping stations.

Step 4-4, using the improved multi-objective gray wolf algorithm to solve the multi-objective optimal allocation model to obtain a Pareto solution set and determine the water supply volume of the reservoirs, rivers, and transferred water under different solutions.

Figure 2:
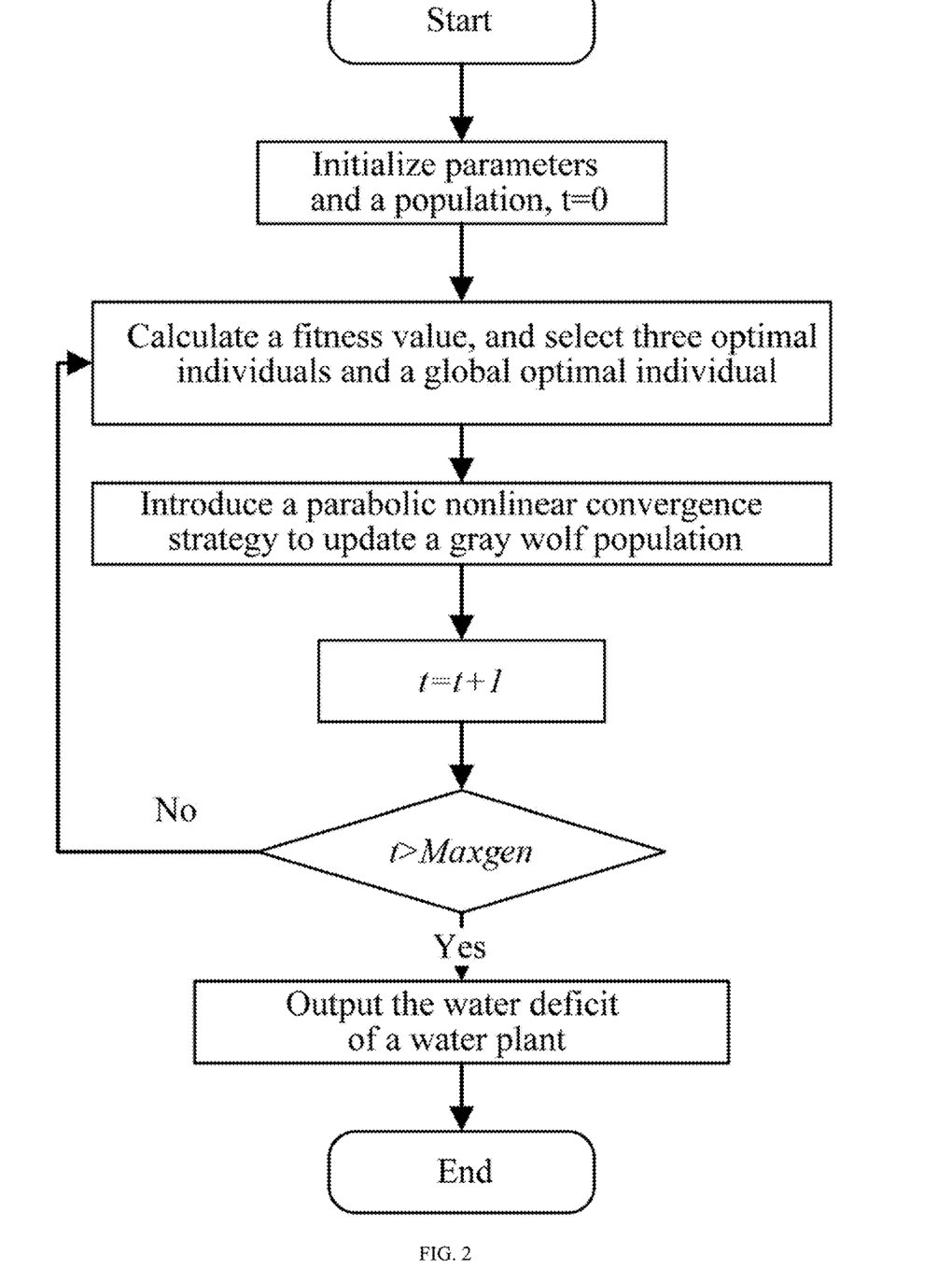
FIG. 2 is a specific flow chart of step 4-2 in the present application.

In the step 4-2 of using the improved single-objective gray wolf algorithm to solve the single-objective optimal allocation model of each sub-zone, the flow chart is shown in FIG. 2, and the steps are as follows:

step 4-2-1, initializing algorithm parameters and a population. The size of the population is Popsize, the maximum number of iterations Maxgen, the number of decision variables is Dimension, the value range of the decision variables is [Lb, Ub], and the gray wolf population is initialized according to the value range of the decision variables $X=[X_1, X_2, \ldots, X_i, \ldots, X_{Popsize}]$;

step 4-2-2, calculating the fitness of each individual in the population, wherein the greater the water supply guarantee rate of the water plant is, the greater the fitness is; performing sorting according to the fitness, and selecting the three individuals with the maximum fitness as $X_\alpha, X_\beta, X_\delta$, where $X_\alpha$ represents the global optimal gray wolf;

step 4-2-3, updating convergence factors A, C, and a, and updating all gray wolves in the population according to $X_\alpha$, $X_\beta$, $X_\delta$, wherein the updating equation is:

$D_\alpha = |C \cdot X_\alpha(t) - X_i(t)|$ $D_\beta = |C \cdot X_\beta(t) - X_i(t)|$ $D_\delta = |C \cdot X_\delta(t) - X_i(t)|$ $X_1 = X_\alpha(t) - A \cdot D_\alpha$ $X_2 = X_\beta(t) - A \cdot D_\beta$ $X_3 = X_\delta(t) - A \cdot D_\delta$ $X_i(t+1) = (X_1 + X_2 + X_3)/3$ (4)

where t represents the number of iterations, $A=2a \times r_1 - a$, $C=2 \times r_2$; A, C, and a are all convergence factors, $r_1$ and $r_2$ are random variables, $r_1, r_2 \in (0, 1)$, and $D_\alpha, D_\beta, D_\delta$ represent the distance between the individuals $D_\alpha, D_\beta, D_\delta$ and the individual $X_i$, respectively.

Step 4-2-4, judging whether the number of iterations has reached MAXGEN, if yes, terminating the operation and outputting the water deficit of the water plant; and if not, returning to step 4-2-2 to continue the evolution; and step 4-2-5, determining the water deficit of all water plants in the system.

Figure 3:
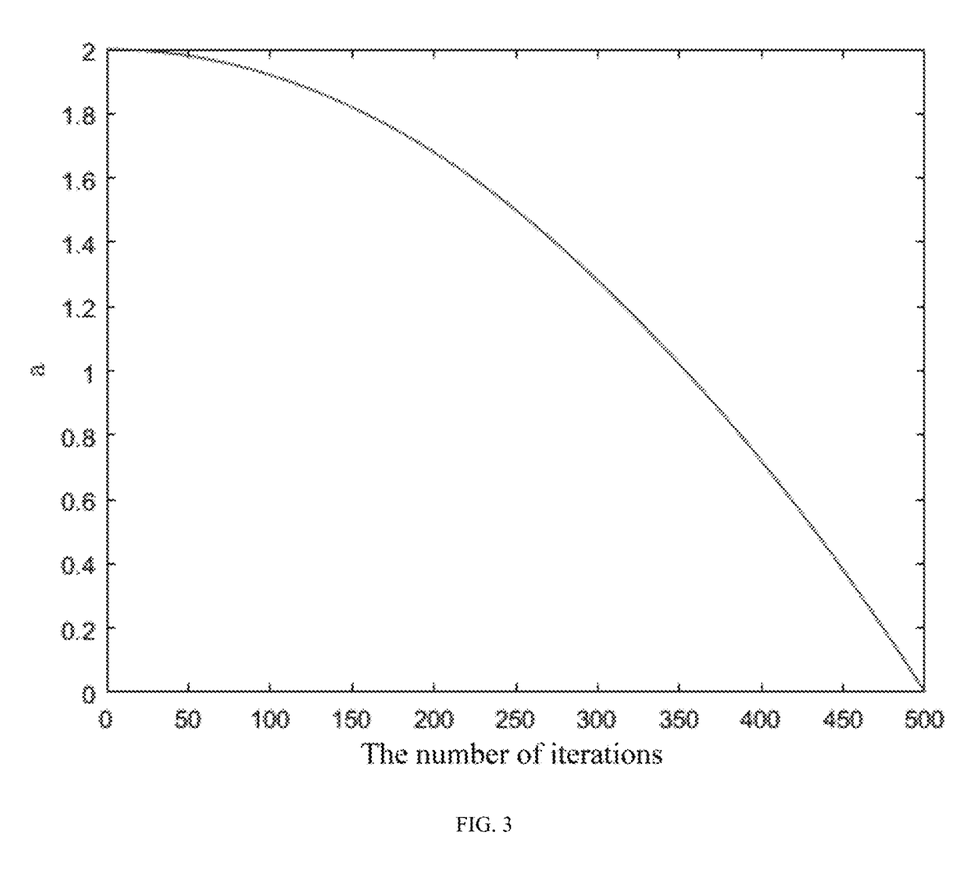
FIG. 3 is a nonlinear convergence diagram of s parameter a in step 4-2-3 of the present application.

As shown in FIG. 3, the convergence factor a adopts a parabola-based nonlinear convergence mode to converge, and the equation is:

$a = 2 - 2(t/\mathrm{MAXGEN})^2$ (5)

wherein, t represents the current number of iterations, and MAXGEN represents the maximum number of iterations.

Figure 4:
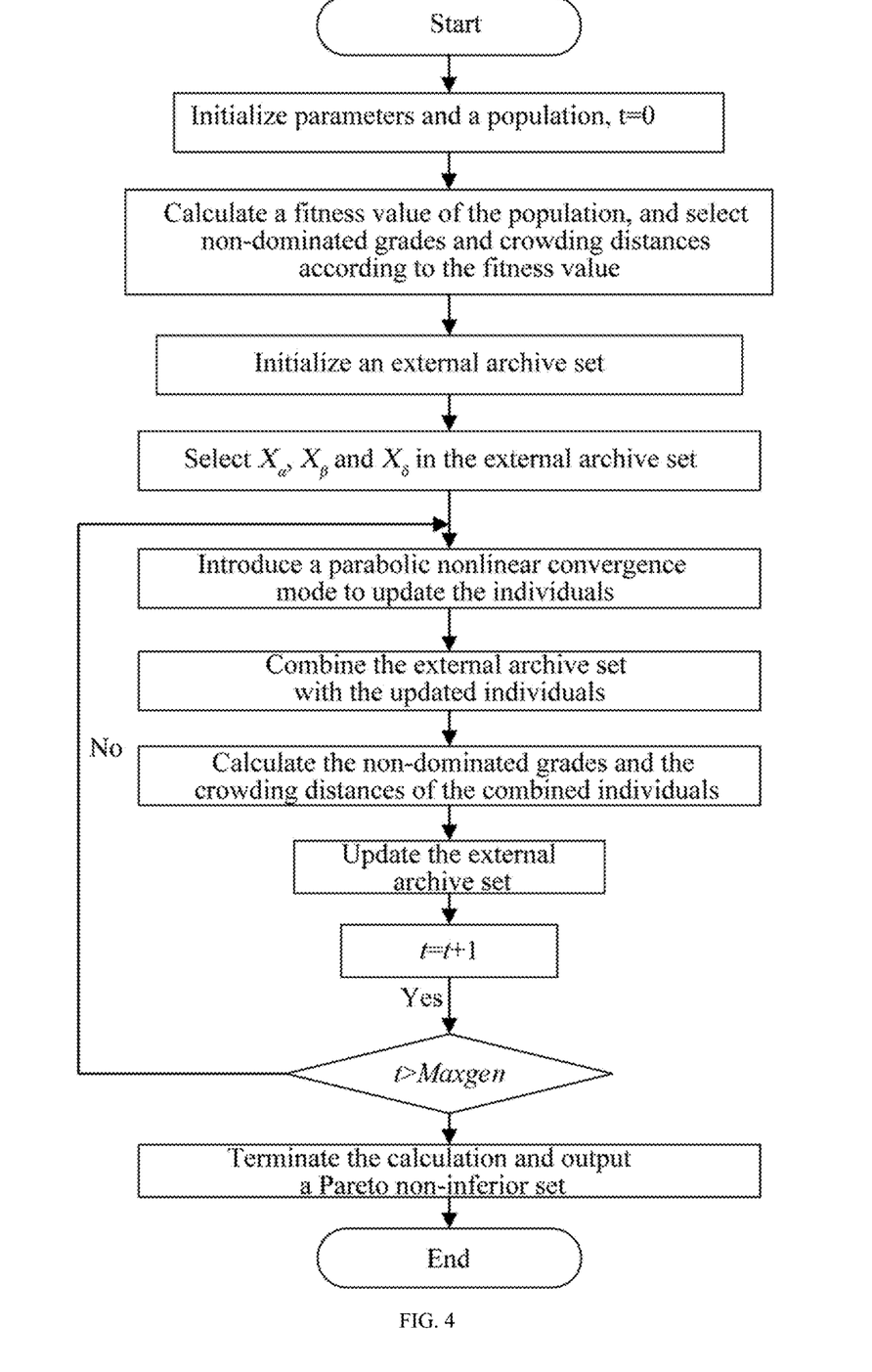
FIG. 4 is a specific flow chart of step 4-4 in the present application.

In the step 4-4 of using the improved multi-objective gray wolf algorithm to solve the multi-objective optimal allocation model, so as to obtain the Pareto solution set and determine the water supply volume of reservoirs, and the transferred water volume, respectively, under different solutions, the flow chart is shown in FIG. 4, and the specific steps are as follows:

step 4-4-1, initializing algorithm parameters and a population. The size of the population is $N_p$, the number of external archive sets is $N_e$, the maximum number of iterations is $N_{gen}$, the number of decision variables is $N_d$, the value range of the decision variables is [Lb, Ub], and the gray wolf population X is initialized according to the value range of the decision variables;

step 4-4-2, calculating the fitness value of each individual in the population, calculating the non-dominated sorting grades $[P_j^t]_{rank}$ (j=1,2, ..., N) and crowding distances $d_j^t$ (j=1,2, ..., N) of all individuals according to the fitness value, and selecting $N_e$ individuals to form an initial external archive set NEA according to the following rules: selecting individuals from the non-dominated sorting grade rank=1, and if the number of individuals in the grade rank=1 is greater than $N_e$, selecting the first $N_e$ individuals with greater crowding distances in grade rank=1; if not, selecting individuals with greater crowding distances with sorting grades rank=rank+1, until the number of individuals contained in the external archive set NEA is $N_e$, so as to ensure the diversity of the population;

step 4-4-3, selecting three individuals $X_\alpha'$, $X_\beta'$, $X_\delta'$, as priority grades in the external archive set NEA according to the following rules: if the number of non-dominated sorting grades is equal to 1, selecting the first three individuals with the maximum crowding distance in the first grade as $X_\alpha'$, $X_\beta'$, $X_\delta'$, respectively; if the number of the non-dominated sorting grades is equal to 2, selecting the first two individuals with the maximum crowding distance in the grade rank=1 as $X_\alpha'$, $X_\beta'$, respectively, and selecting the individual with the maximum crowding distance in the grade rank=2 as $X_\delta'$; if the number of the non-dominated sorting grades is greater than 2, selecting three individuals with maximum crowding distance in the grades rank=1, 2, and 3 as $X_\alpha'$, $X_\beta'$, $X_\delta'$, respectively, where $X_\alpha'$ represents the global optimal gray wolf;

step 4-4-4, updating all gray wolf individuals in the population according to $X_\alpha'$, $X_\beta'$, $X_\delta'$ by using formulas (4)-(5);

step 4-4-5, calculating the fitness value of each individual in the population, merging the updated new population with the external archive set NEA, and updating the external archive set NEA according to the selection rules in step 4-4-2;

step 4-4-6, judging whether the number of iterations has reached MAXGEN, if yes, terminating the operation and outputting a Pareto non-inferior solution set in the external archive set NEA; if not, returning to step 4-4-3 to continue the evolution; and step 4-4-7, collating and outputting the volumes of reservoir supply, the volume of water pumped from river, and the transferred water respectively under different non-inferior solutions.

Figure 5:
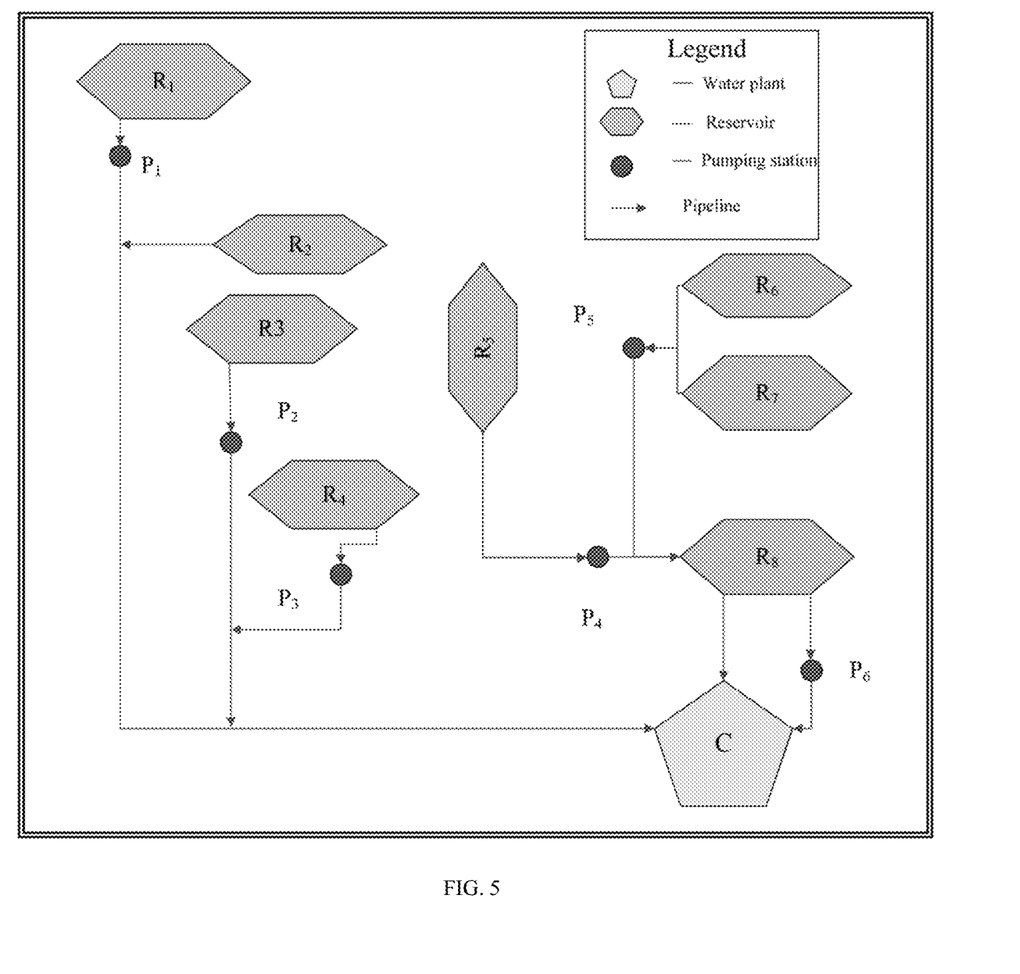
FIG. 5 is a generalized diagram of a $D_2$ zoning system in an embodiment.

Now, the optimal allocation of the complex water resource system of a city is taken as an example to illustrate the effectiveness and rationality of the proposed method. The study zone involves 27 reservoirs, 22 pumping stations, and 4 water supply plants: A, B, C, and D. According to the water supply relationship of the pumping stations, the reservoirs, and the water plants, this zone can be divided into 3 sub-zones: $D_1$, $D_2$, and $D_3$, wherein the water plants A and B are located in the sub-zone $D_1$, the water plant C is located in the sub-zone $D_2$, and the water plant D is located in the sub-zone $D_3$. The system is generalized, and as shown in FIG. 5, it is a generalization diagram of the sub-zone $D_2$ system; and the hydraulic relationship of each sub-zone is analyzed, a digital matrix is established, and Table 1 shows a part of information of the digital matrix of the hydraulic relationship of the sub-zone $D_2$. The calculation time period is selected as Jun. 1, 2016, and the multigrade optimal allocation model of the water resource system is constructed and solved according to the types of water supply sources. Table 2 shows multiple groups of reservoir water allocation solutions selected from a multi-objective solution set by taking June 1 as an example. It can be seen that the water supply guarantee rates of the four water plants on June 1 all meet 100% under various solutions. Among them, the reservoir $R_1$ in the sub-zone $D_1$ stores the transferred water and is responsible for supplying water to the three water plants A, B, and C.

TABLE 1

A part of information of the digital matrix of the hydraulic relationship o the sub-zone $D_2$.

| Node | Pipe section | | | | | | | | | |
|---|---|---|---|---|---|---|---|---|---|---|
| | a | b | C | D | e | f | g | h | i | j |
| 1 | −1 | 0 | 0 | 0 | 0 | 0 | 0 | 0 | 0 | 0 |
| 2 | 0 | 0 | 0 | −1 | 0 | 0 | 0 | 0 | 0 | 0 |
| 3 | 0 | 0 | 0 | 0 | 0 | 0 | 0 | −1 | 0 | 0 |
| 4 | 0 | 0 | 0 | 0 | 0 | 0 | 0 | 0 | 0 | 0 |
| 5 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 0 | 0 | 0 | 0 | 0 | 1 | −1 | 0 |
| 11 | 0 | 0 | 0 | 1 | −1 | 0 | 0 | 0 | 0 | 0 |
| 12 | 0 | 0 | 0 | 0 | 0 | 0 | 0 | 0 | 1 | −1 |

TABLE 2

Multiple groups of reservoir water allocation solutions on June 1

| Sub-zone | Reservoir | Water plant | Water supply volume (m³) | | | | |
|---|---|---|---|---|---|---|---|
| | | | Solution 1 | Solution 2 | Solution 3 | Solution 4 | Solution 5 |
| $D_1$ | $R_1$ | C | 5393.04 | 5392.92 | 5393.00 | 5393.02 | 5392.99 |
| | | A | 8373.10 | 8373.26 | 8373.67 | 8373.68 | 8372.10 |
| | | B | 5578.44 | 5578.71 | 5580.53 | 5578.94 | 5578.44 |
| | $R_2$ | B | 101.73 | 102.61 | 103.27 | 102.29 | 105.34 |
| | $R_3$ | A | 50.26 | 51.06 | 50.09 | 50.89 | 51.12 |
| | $R_4$ | A | 431.60 | 430.90 | 443.54 | 429.29 | 431.06 |
| | $R_5$ | A | 1260.27 | 1260.24 | 1260.23 | 1260.39 | 1260.37 |
| | $R_6$ | A | 6862.11 | 6860.80 | 6862.00 | 6861.88 | 6860.83 |
| | $R_7$ | B | 300.92 | 300.68 | 301.08 | 301.46 | 301.13 |
| | $R_8$ | B | 230.78 | 232.65 | 235.76 | 231.42 | 231.19 |
| | $R_9$ | B | 543.43 | 541.25 | 543.86 | 545.75 | 543.36 |
| | $R_{10}$ | B | 884.61 | 883.33 | 883.29 | 881.18 | 882.15 |
| $D_2$ | $R_1$ | C | 1267.06 | 1267.00 | 1266.78 | 1266.51 | 1267.94 |
| | $R_2$ | C | 33807.46 | 33807.44 | 33807.68 | 33808.04 | 33808.12 |
| | $R_3$ | C | 170.86 | 171.53 | 170.03 | 172.95 | 172.67 |
| | $R_4$ | C | 109.91 | 110.17 | 110.38 | 120.81 | 150.33 |
| | $R_5$ | Reservoir $R_8$ | 10113.50 | 10116.34 | 10113.83 | 10114.34 | 10113.75 |
| | $R_6$ | Reservoir $R_8$ | 483.97 | 482.68 | 483.15 | 482.99 | 483.63 |
| | $R_7$ | Reservoir $R_8$ | 5068.30 | 5068.45 | 5068.76 | 5069.15 | 5068.38 |
| | $R_8$ | C | 30042.96 | 30043.82 | 30043.84 | 30043.01 | 30043.30 |
| $D_3$ | $R_1$ | B | 5762.48 | 5762.59 | 5761.38 | 5761.43 | 5762.32 |
| | | D | 308.00 | 301.14 | 302.86 | 302.86 | 305.81 |
| | $R_2$ | D | 951.79 | 951.77 | 950.98 | 949.42 | 951.04 |
| | | D | 6595.54 | 6594.59 | 6595.57 | 6595.58 | 6594.45 |
| | $R_3$ | D | 23434.99 | 23435.64 | 23433.50 | 23436.18 | 23379.47 |
| | $R_4$ | $R_5$ | 1586.51 | 1585.48 | 1586.38 | 1585.95 | 1586.38 |
| | | D | 1284.06 | 1280.93 | 1280.50 | 1280.21 | 1286.96 |
| | $R_5$ | D | 18197.74 | 18197.70 | 18197.73 | 18197.73 | 18197.74 |
| | $R_6$ | D | 6149.17 | 6149.16 | 6149.16 | 6149.15 | 6148.85 |
| | $R_7$ | D | 2449.09 | 2449.02 | 2449.05 | 2449.07 | 2448.30 |
| Transferred water (m³) | | | 34144.86 | 35056.72 | 35768.75 | 37052.57 | 38872.32 |
| Total (m³) | | | 187540.43 | 188427.85 | 189156.33 | 190431.82 | 192256.23 |
| Water supply guarantee rate (%) | | | 100% | 100% | 100% | 100% | 100% |
| Water supply cost (RAB) | | | 54511.63 | 55161.18 | 55680.59 | 56604.64 | 57938.49 |

What is claimed is:

1. An optimal allocation method of a complex water resource system based on a "zoning-grading" theory, comprising the following steps:

step 1, obtaining primary information data of the complex water resource system, comprising a reservoir level-reservoir storage capacity relationship curve, basic characteristic parameters, and geographical location information of reservoirs, pumping stations, river, water pipelines and water plants;

step 2, representing the reservoirs, the pumping stations, the rivers, and the water plants in the complex water resource system as physical nodes with a unique identifier, representing the water pipelines as directed line segments based on an actual flow direction, generating a topological network that represents a physical connection relationship;

step 3, taking the water plants as a zoning center, dividing the complex water resource system into multiple zones in accordance with to a water supply relationship among the reservoirs, the pumping stations, the rivers, the water pipelines, and the water plants, marking an intersection of each zone as a virtual node, and establishing a digital matrix of hydraulic relationships of zones, wherein elements of the digital matrix of hydraulic relationships of zones are coded as 0,−1, and 1:0 represents no hydraulic connection, −1 represents node outflow, and 1 represents node inflow;

step 4, based on the topological network and the digital matrix of hydraulic relationships of zones, constructing and solving a multigrade optimal allocation model of the complex water resources resource system according to water sources types so as to obtain an optimal water allocation solution set;

wherein the water sources in the step 4 comprise local water and transferred water, wherein the local water comprises water stored in reservoirs and rivers; and the step of constructing and solving the multigrade optimal allocation model of the complex water resource system according to the types of water supply sources comprises the following steps:

step 4-1, considering only local water, establishing a first-grade single-objective optimal allocation model of water resources: with the complex water resource system of each zone as an object, constructing the single-objective optimal allocation model of water resources of each zone with a maximum water supply guarantee rate of water plants as an objective function, and with a water balance, an available water supply of local water sources, a discharge capacity of the pumping stations, and the water carrying capacity of pipelines as constraints, wherein an objective function is:

$$\text{Max } f(x) = \sum_{i=1}^{I}\sum_{j=1}^{J} x_{ij} / \sum_{j=1}^{J} Q_j * 100\%$$

where $Q_j$ represents a water demand of a $j^{th}$ water plant, and $x_{ij}$ represents a water supply volume from a $i^{th}$ reservoir to a $j^{th}$ water plant;

step 4-2: using an improved single-objective gray wolf algorithm to solve the single-objective optimal allocation model of each zone established in the step 4-1, so as to determine a water deficit $WQ_i$ of each water plant, wherein i=1,2, ..., M, and wherein M represents a number of water plants in the entire complex water resource system;

step 4-3, considering both the local water and the transferred water, establishing a second-grade multi-objective optimal allocation model of water resources: with the entire complex water resource system as the object, constructing the multi-objective optimal allocation model of water resources with the maximum water supply guarantee rate and a minimum total operating cost as objective functions, and with an amount of the externally transferred water allocated to each water plant not less than the water deficit $WQ_i$ of each water plant, the water balance, the available water supply of local water sources, the available water supply of externally transferred water resources, the discharge capacity of the pumping stations, and the water carrying capacity of the pipelines as constraints, wherein objective functions are:

maximum water supply guarantee rate: Max $f_1(x) =$ $$\sum_{k1}^{K}\sum_{i=1}^{I}\sum_{j=1}^{J} x_{ij} / \sum_{k=1}^{K}\sum_{j=1}^{J} Q_j \times 100\%$$

minimum total operating cost: Min $f_2(x) = M_e + M_i - M_b$ where k=1, 2, ..., K represents a number of the zones, $M_i$ represents a usage fee of local water, Me represents the usage fee of transferred water, and $M_b$ represents an income; and step 4-4, using an improved multi-objective gray wolf algorithm to solve the multi-objective optimal allocation model of the system established in the step 4-3, screening a Pareto solution set by non-dominated sorting and congestion distance, to output a scheme for reservoir water allocation and external water transfer; and step 5, based on the digital matrix of hydraulic relationships of zones, verifying a hydraulic feasibility of the scheme for reservoir water allocation and external water transfer output from the step 4-4 in the topological network, and generating an executable water resource allocation scheme based on the verified hydraulic feasibility, comprising:

eliminating invalid schemes that violate a flow capacity of a pump station or pipeline water delivery capacity constraints to obtain valid schemes; and selecting a set of schemes that satisfy a preset water supply guarantee rate and a cost threshold from the valid schemes.

2. The optimal allocation method of the complex water resource system based on the "zoning-grading" theory according to claim 1, wherein the step 4-2 of using the improved single-objective gray wolf algorithm to solve the single-objective optimal allocation model of each zone comprises the following steps:

step 4-2-1, initializing parameters and a population of the improved single-objective gray wolf algorithm, wherein a size of the population is Popsize, a maximum number of iterations Maxgen, a number of decision variables is Dimension, a value range of the decision variables is [Lb, Ub], and a gray wolf population is initialized according to the value range of the decision variables $X=[X_1, X_2, \ldots, X_i, \ldots, X_{Popsize}]$;

step 4-2-2, calculating a fitness of each individual in the population, wherein a greater the water supply guarantee rate of the water plants is, a greater the corresponding fitness is; performing sorting of the fitness, and selecting and storing three individuals with maximum fitness as $X_\alpha$, $X_\beta$, $X_\delta$, where $X_{60}$ a represents a global optimal gray wolf;

step 4-2-3, using $X_\alpha$, $X_\beta$, $X_\delta$ to update all gray wolves in the population, wherein the updating equation is:

$$D_\alpha = |C \cdot X_\alpha(t) - X_i(t)|$$

$$D_\beta = |C \cdot X_\beta(t) - X_i(t)|$$

$$D_\delta = |C \cdot X_\delta(t) - X_i(t)|$$

$$X_1 = X_\alpha(t) - A \cdot D_\alpha$$

$$X_2 = X_\beta(t) - A \cdot D_\beta$$

$$X_3 = X_\delta(t) - A \cdot D_\delta$$

$$X_i(t+1) = (X_1 + X_2 + X_3)/3 \qquad (1)$$

where t represents the number of iterations, $A = 2a \times r_1 - a$, $C = 2 \times r_2$; A, C, and a are all convergence factors, $r_1$ and $r_2$ are random variables, $r_1, r_2 \in (0, 1)$, and $D_\alpha$, $D_\beta$, $D_\delta$ represent the distances between the individuals $D_\alpha$, $D_\beta$, $D_\delta$ and the individual $X_i$, respectively;

step 4-2-4, judging whether the number of iterations has reached MAXGEN, if yes, terminating the operation and outputting the water deficit of the water plants; and if not, returning to step 4-2-2; and step 4-2-5, determining the water deficit of all water plants in the system.

3. The optimal allocation method of the complex water resource system based on the "zoning-grading" theory according to claim 2, wherein in the step 4-2-3, the convergence factor $\alpha$ adopts a parabola-based nonlinear convergence mode to converge, and the equation is:

$$a = 2 - 2(t/\text{MAXGEN})^2 \qquad (2).$$

4. The optimal allocation method of the complex water resource system based on the "zoning-grading" theory according to claim 3, wherein the step 4-4 of using the improved multi-objective gray wolf algorithm to solve the multi-objective optimal allocation model of the system comprises the following steps:

step 4-4-1, initializing parameters and a population of the improved multi-objective gray wolf algorithm, wherein the size of the population is $N_P$, a number of external archive sets is $N_e$, the maximum number of iterations is $N_{gen}$, the number of decision variables is $N_d$, the value range of the decision variables is [Lb, Ub], and the gray wolf population X is initialized according to the value range of the decision variables;

step 4-4-2, calculating a fitness value of each individual in the population, calculating non-dominated sorting grades $[P_j^t]_{rank}$ (j=1,2, ..., N) and crowding distances $d_j^t$ (j=1,2, ..., N) of all individuals according to the fitness values, and selecting $N_e$ individuals to form an initial external archive set NEA according to the following rules: selecting individuals from a non-dominated sorting grade rank=1, and if the number of individuals in grade rank=1 is greater than $N_e$, selecting the first $N_e$ individuals with greater crowding distances in grade rank=1; if not, selecting individuals with greater crowding distances with sorting grades rank=rank+1, until the number of individuals contained in the initial external archive set NEA is $N_e$, so as to ensure the diversity of the population;

step 4-4-3, selecting three individuals $X_\alpha'$, $X_\beta'$, $X_\delta'$ as priority grades in the initial external archive set NEA according to the following rules: if the non-dominated sorting grades are all non-dominant grades or a first grade, selecting first three individuals with a maximum crowding distance as $X_\alpha'$, $X_\beta'$, $X_\delta'$, respectively; if the number of the non-dominated sorting grades is equal to 2, selecting first two individuals with the maximum crowding distance in the grade rank=1 as $X_\alpha'$, $X_\beta'$, respectively, and selecting the individual with the maximum crowding distance in grade rank=2 as $X_\delta'$; if the number of the non-dominated sorting grades is greater than 2, selecting three individuals with maximum crowding distance in the grades rank=1, 2, and 3 as $X_\alpha'$, $X_\beta'$, $X_\delta'$, respectively, where $X_\alpha'$ represents a global optimal gray wolf;

step 4-4-4, updating all gray wolf individuals in the population according to $X_\alpha'$, $X_\beta'$, $X_\delta'$ by using formulas (4)-(5);

step 4-4-5, calculating the fitness value of each individual in the population, merging an updated new population with the initial external archive set NEA, and updating the initial external archive set NEA according to the selection rules in step 4-4-2;

step 4-4-6, judging whether the number of iterations has reached MAXGEN, if yes, terminating the operation and outputting a Pareto non-inferior solution set in the initial external archive set NEA; if not, returning to step 4-4-3; and step 4-4-7, collating and outputting a volume of reservoir supply, a volume of water pumped from river and a transferred water volume, respectively, corresponding to different non-inferior solutions.

* * * * *